(12) United States Patent
Wang et al.

(10) Patent No.: US 8,296,926 B2
(45) Date of Patent: Oct. 30, 2012

(54) METHOD FOR MAKING WOUND STATOR OF AUTOMOTIVE GENERATOR

(75) Inventors: Chun-Yuan Wang, Taipei (TW); Yu-Tang Guan, Taipei (TW)

(73) Assignee: Victory Industrial Corporation, Hsi-Chih, New Taiwan (CN)

( * ) Notice: Subject to any disclaimer, the term of this patent is extended or adjusted under 35 U.S.C. 154(b) by 0 days.

(21) Appl. No.: 12/825,204

(22) Filed: Jun. 28, 2010

(65) Prior Publication Data

US 2010/0325874 A1  Dec. 30, 2010

(30) Foreign Application Priority Data

Jun. 30, 2009  (TW) .............................. 98122163 A (51) Int. Cl.
*H02K 15/00*  (2006.01)

(52) U.S. Cl. ............... 29/596; 29/605; 29/606; 29/597; 29/732

(58) Field of Classification Search ............ 29/596–598, 29/732–736, 605; 310/179, 215; 219/125.11
See application file for complete search history.

(56) References Cited

U.S. PATENT DOCUMENTS

| | | | |
|---|---|---|---|
| 6,181,043 B1 * | 1/2001 | Kusase et al. ................. | 310/201 |
| 6,700,282 B2 * | 3/2004 | Mori et al. .................... | 310/208 |
| 6,834,422 B2 * | 12/2004 | Kato ............................... | 29/596 |
| 7,225,526 B2 * | 6/2007 | Tokizawa ....................... | 29/596 |
| 7,287,311 B2 * | 10/2007 | Ichikawa et al. ............... | 29/596 |
| 7,788,790 B2 * | 9/2010 | Neet ............................... | 29/596 |
| 2004/0207284 A1 * | 10/2004 | Neet .............................. | 310/215 |
| 2004/0221443 A1 * | 11/2004 | Oohashi et al. ................ | 29/596 |

\* cited by examiner

*Primary Examiner* — Minh Trinh
(74) *Attorney, Agent, or Firm* — Clifford B. Perry (57) ABSTRACT

A method for making a wound stator of an automotive generator is provided for replacing the conventional winding technique. The method includes: forming a stator ring provided with a plurality of annularly arranged radial through slots; cutting a copper wire into a plurality of wire units each having a rectangular cross section; inserting the wire units into the through slots in an interlacing manner; and soldering wire ends of the wire units sequentially so as to form a connected loop.

7 Claims, 9 Drawing Sheets

METHOD FOR MAKING WOUND STATOR OF AUTOMOTIVE GENERATOR

BACKGROUND

1. Technical Field

The present invention relates to a method for making a wound stator of an automotive generator and, more particularly, to a novel method for making a wound stator so as to enhance the power generation efficiency of a generator.

2. Description of Related Art

The stator is a major mechanism in an electric generator. An induced current is generated by the generator through induction between the stator and the rotor. The conventional method for making a wound stator of an automotive generator involves winding enameled wires around T-shaped claws of a stator ring so as to form a multi-layer induction coil around the stator ring.

However, a wound stator made by the conventional winding technique has high copper loss. The overall copper loss is increased because the copper cores exposed from the wire ends of the enameled wire windings are rather long. Hence, not only is it impossible to further enhance product performance, but also a motor equipped with such a stator is prone to temperature rise during operation. Moreover, according to the conventional winding technique, the spacing between windings is irregular; in other words, the density of windings tends to be inconsistent. The irregular spacing between windings also affects the slot fill factor of the enameled wires and thus lowers the overall power generation efficiency of a generator using such a stator.

BRIEF SUMMARY OF THE INVENTION

In order to overcome the aforesaid shortcomings of the prior art, it is a primary objective of the present invention to provide a novel method for making a wound stator of an automotive generator and thereby solve the efficiency problems associated with the conventional winding technique.

To achieve the above and other objectives, the present invention provides a method for making a wound stator of an automotive generator, wherein the method includes:

forming a stator ring provided with a plurality of annularly arranged radial through slots;

cutting a copper wire into a plurality of wire units each having a rectangular cross section;

inserting the wire units into the through slots in an interlacing manner; and soldering wire ends of the wire units sequentially so as to form a connected loop.

In a particular embodiment of the invention, the following operations are performed:

a stator ring forming step, in which a stator ring is made by a stator ring forming process and thus provided with a plurality of annularly arranged elongate radial through slots, wherein the total number of the through slots is a multiple of three;

a copper wire cutting step, in which an enameled copper wire having a rectangular cross section is cut into a plurality of straight wire units having an equal length;

a wire unit curving and bending step, in which each straight wire unit is curved into a U shape, and then the smoothly curved portion of each U-shaped wire unit is further bent into a V shape;

a wire-end insulating coating removing step, in which an insulating coating on two of each curved and bent wire unit is cut off;

an insulating paper installing step, in which a plurality of insulating paper sleeves corresponding to inner peripheral walls of the through slots are inserted into the through slots of the stator ring, respectively;

a wire unit inserting step, in which each through slot of the stator ring is divided, along an outside-to-inside direction, into four equal sections, namely a first section, a second section, a third section, and a fourth section; and the wire units are separated into two equal groups, namely a first group and a second group, wherein each wire unit in the first group has one of its arms inserted into the second section of the corresponding through slot and the other arm spanning across five through slots in the same direction and inserted into the third section of the following (sixth) through slot, and wherein each wire unit in the second group has one of its arms inserted into the first section of the corresponding through slot and the other arm spanning across five through slots in the same direction and inserted into the fourth section of the following (sixth) through slot, the wire units in the first and second groups being sequentially inserted into all the through slots in an interlacing manner so as to form an annular winding structure while the wire ends of the wire units jut out from opposite ends of the through slots;

a wire unit pressing and arranging step, in which a pressure is applied by a pressing machine to upper ends of the inserted wire units such that the wire units form an even surface on one side of the stator ring while the wire ends jutting out from an opposite side of the stator ring are flush with one another;

a wire end twisting step, in which the wire ends of the wire units in the first group are bent toward the same tangential direction at positions where the wire ends of the wire units in the first group begin to jut out from the through slots; then, tips of the wire ends of the wire units in the first group are bent so as to point outward from the through slots; in addition, the wire ends of the wire units in the second group that jut out from the through slots are bent toward a tangential direction opposite to that toward which the wire ends of the wire units in the first group are bent; and tips of the wire ends of the wire units in the second group are bent so as to point outward from the through slots, wherein the tips of the wire ends of the wire units in the second group that extend from the first sections correspond in position to and are juxtaposed with the tips of the wire ends of the corresponding wire units in the first group that extend from the second sections, and the tips of the wire ends of the wire units in the first group that extend from the third sections correspond in position to and are juxtaposed with the tips of the wire ends of the corresponding wire units in the second group that extend from the fourth sections; and a wire end soldering step, in which the bent and juxtaposed tips of the wire ends of the wire units in the first and second groups are soldered such that the originally unconnected wire units form a circuit, i.e., a connected loop.

A stator made by the method of the present invention can effectively reduce copper loss, deliver enhanced performance, and prevent the temperature of a motor equipped with the stator from rising rapidly during operation. Besides, as the wire units are closely and neatly interlaced, the density of windings can be efficiently controlled, the slot fill factor is raised, and consequently the overall power generation efficiency of a generator using the stator is increased.

BRIEF DESCRIPTION OF THE DRAWINGS

The invention as well as a preferred mode of use, further objectives, and advantages thereof will be best understood by referring to the following detailed description of illustrative embodiments in conjunction with the accompanying drawings, wherein.

DETAILED DESCRIPTION OF THE EXEMPLARY EMBODIMENTS

The characteristics, subject matter, advantages, and effects of the present invention are detailed hereinafter by reference to embodiments of the present invention and the accompanying drawings. It is understood that the drawings referred to in the following description are intended for illustrative and assisting purposes only and do not necessarily show the actual proportion and precise arrangement of the embodiments. Therefore, the proportion and arrangement shown in the drawings should not be construed as limiting or restricting the scope of the present invention.

Figure 1:
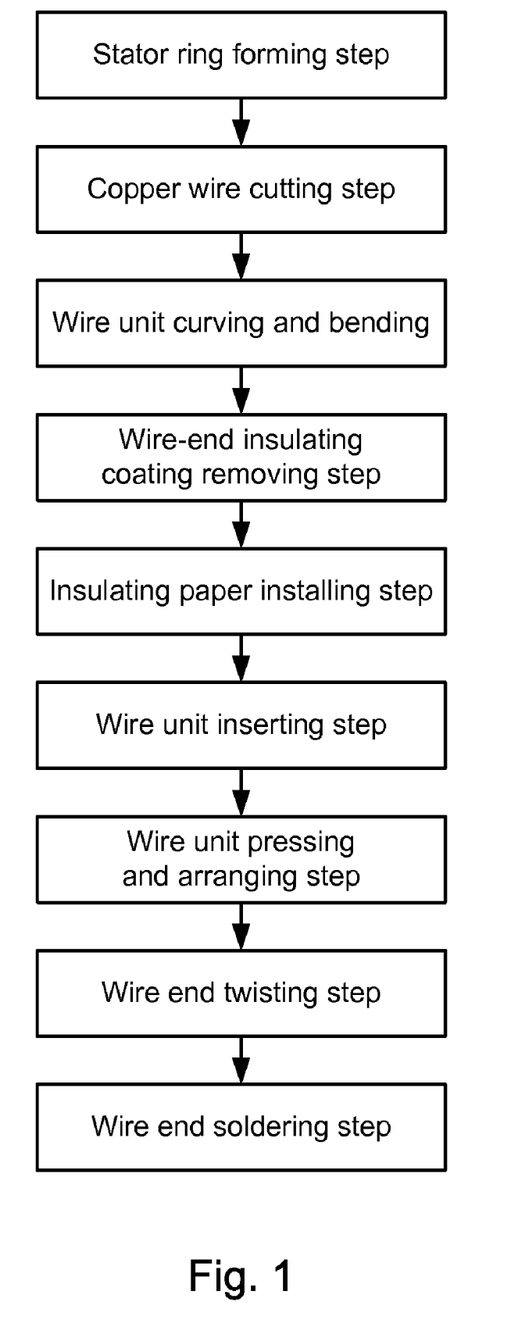
FIG. 1 is a flowchart of a method for making a wound stator of an automotive generator according to the present invention.

Referring to FIG. 1, a detailed method for making a wound stator of an automotive generator according to one embodiment of the present invention includes the following steps:

1. Stator ring forming step,
2. Copper wire cutting step,
3. Wire unit curving and bending step,
4. Wire-end insulating coating removing step,
5. Insulating paper installing step,
6. Wire unit inserting step,
7. Wire unit pressing and arranging step,
8. Wire end twisting step, and
9. Wire end soldering step.

Figure 2:
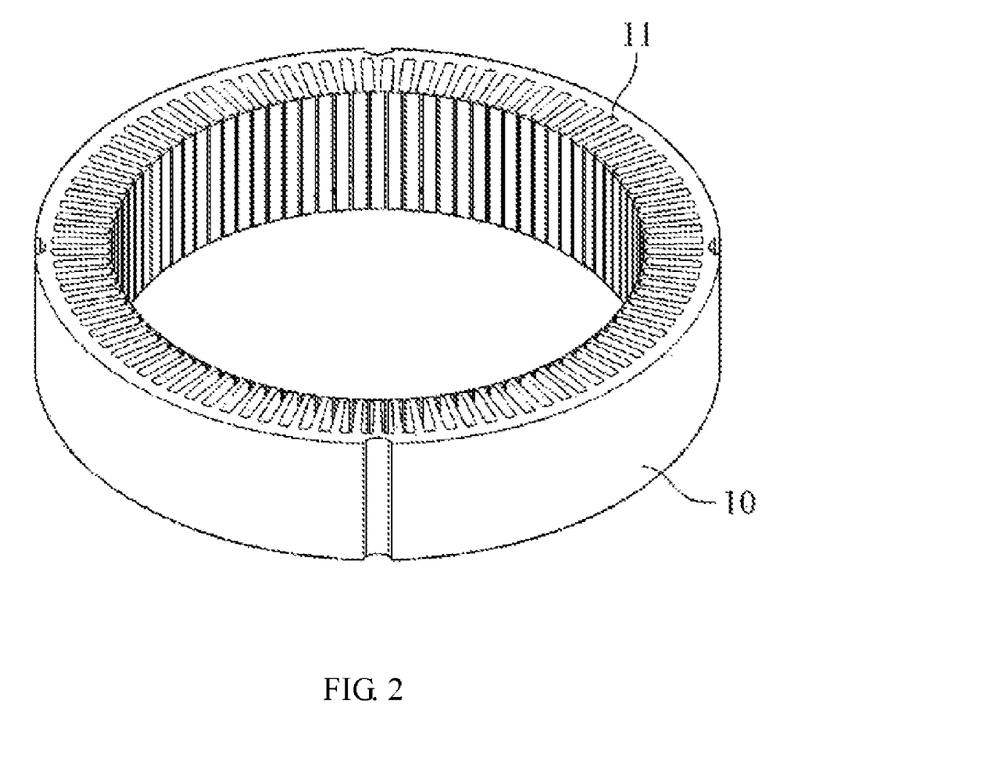
FIG. 2 is a perspective view of a stator ring according to the present invention.

In the stator ring forming step, a stator ring 10 having a specific structure as shown in FIG. 2 is made by a stator ring forming process. The stator ring 10 is provided with a plurality of annularly arranged radial through slots 11, wherein each through slot 11 has an elongate cross section. The total number of the through slots 11 is a multiple of three, such as 96.

Figure 3:
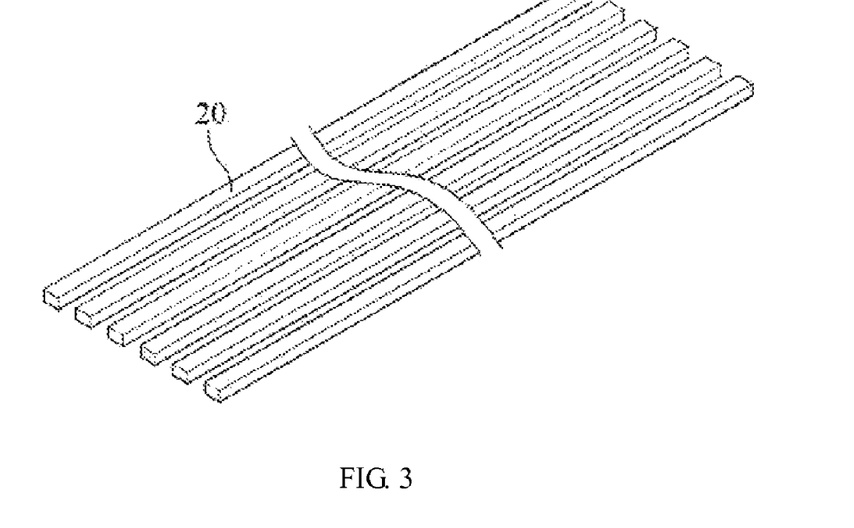
FIG. 3 is a perspective view of wire units according to the present invention.

Referring to FIG. 3, in the copper wire cutting step, an enameled copper wire having a rectangular cross section is cut into a plurality of straight wire units 20 having an equal length.

Figure 4:
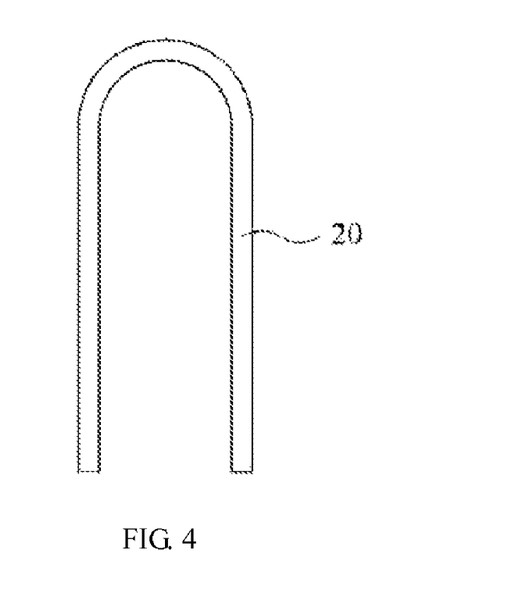
FIGS. 4 and 5 show a wire unit curving and bending step according to the present invention.
Figure 5:
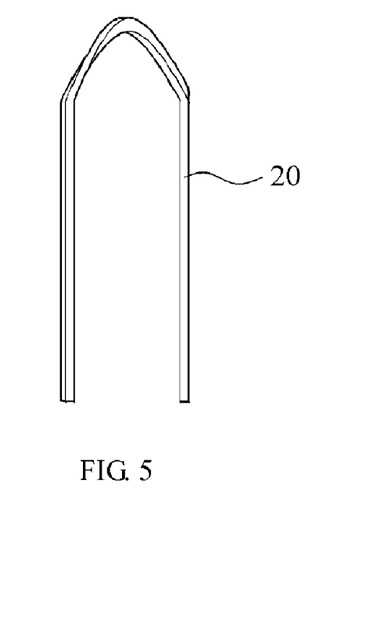

The wire unit curving and bending step is further divided into two sub-steps. First, each of the plurality of straight wire units 20 is curved into a U shape by a tool (such as a vise), as shown in FIG. 4. Then, the smoothly curved portion of each U-shaped wire unit 20 is bent into a V shape, as shown in FIG. 5.

Figure 6:
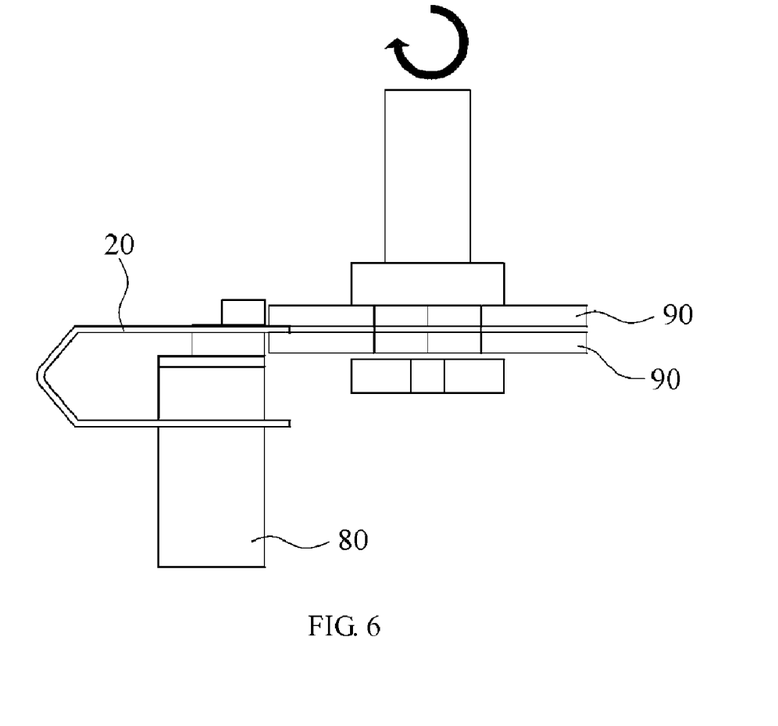
FIGS. 6 through 8 show a wire-end insulating coating removing step according to the present invention.
Figure 7:
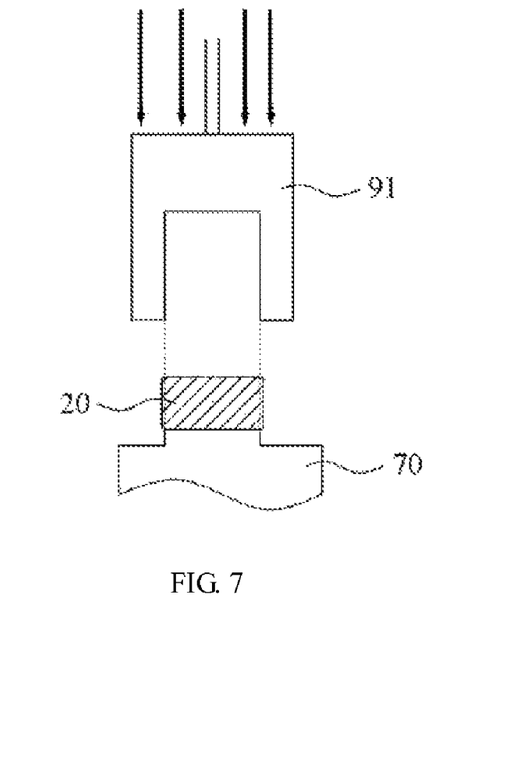
Figure 8:
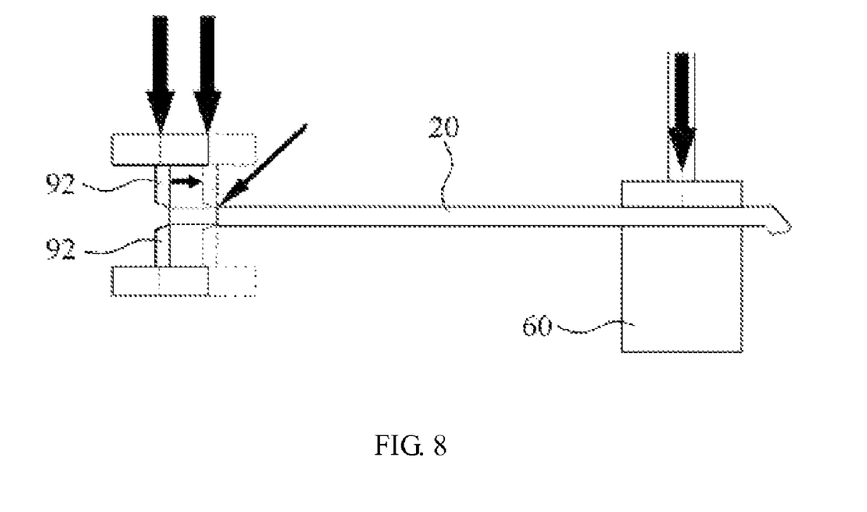

In the wire-end insulating coating removing step, the insulating coating on two arms of each curved and bent wire unit 20 is cut off. Referring to FIG. 6 for a first embodiment of this step, one arm of the wire unit 20 is fixed by a fixture 80 so as to correspond in position to a gap between two milling cutters 90 which rotate coaxially and synchronously. Then, the coating on two opposite surfaces of a wire end is cut off by the milling cutters 90. Following that, the arm is rotated such that the milling cutters 90 cut off the coating on the other two surfaces of the wire end. A second embodiment of this step is shown in FIG. 7, wherein one of the two wire ends of the wire unit 20 is fixed at a fixing seat 70 of a stamper, and the wire end is machined by a stamping cutter 91 of the stamper so as to remove the coating on two opposite surfaces of the wire end of the wire unit 20, wherein the stamping cutter 91 is located to a side of the wire unit 20. Then, the arm of the wire unit 20 where the foregoing wire end is located is rotated, allowing the stamping cutter 91 of the stamper to remove the coating on the other two surfaces of the wire end. Referring to FIG. 8 for a third embodiment of this step, one arm of the wire unit 20 is fixed by a fixture 60, and the tip of a wire end of the wire unit 20 is machined by two opposite electric cutters 92 so as to scrape off the coating on two opposite surfaces of the wire end of the wire unit 20. After the arm of the wire unit 20 is rotated, the cutters 92 scrape off the coating on the other two surfaces of the wire end.

Figure 9:
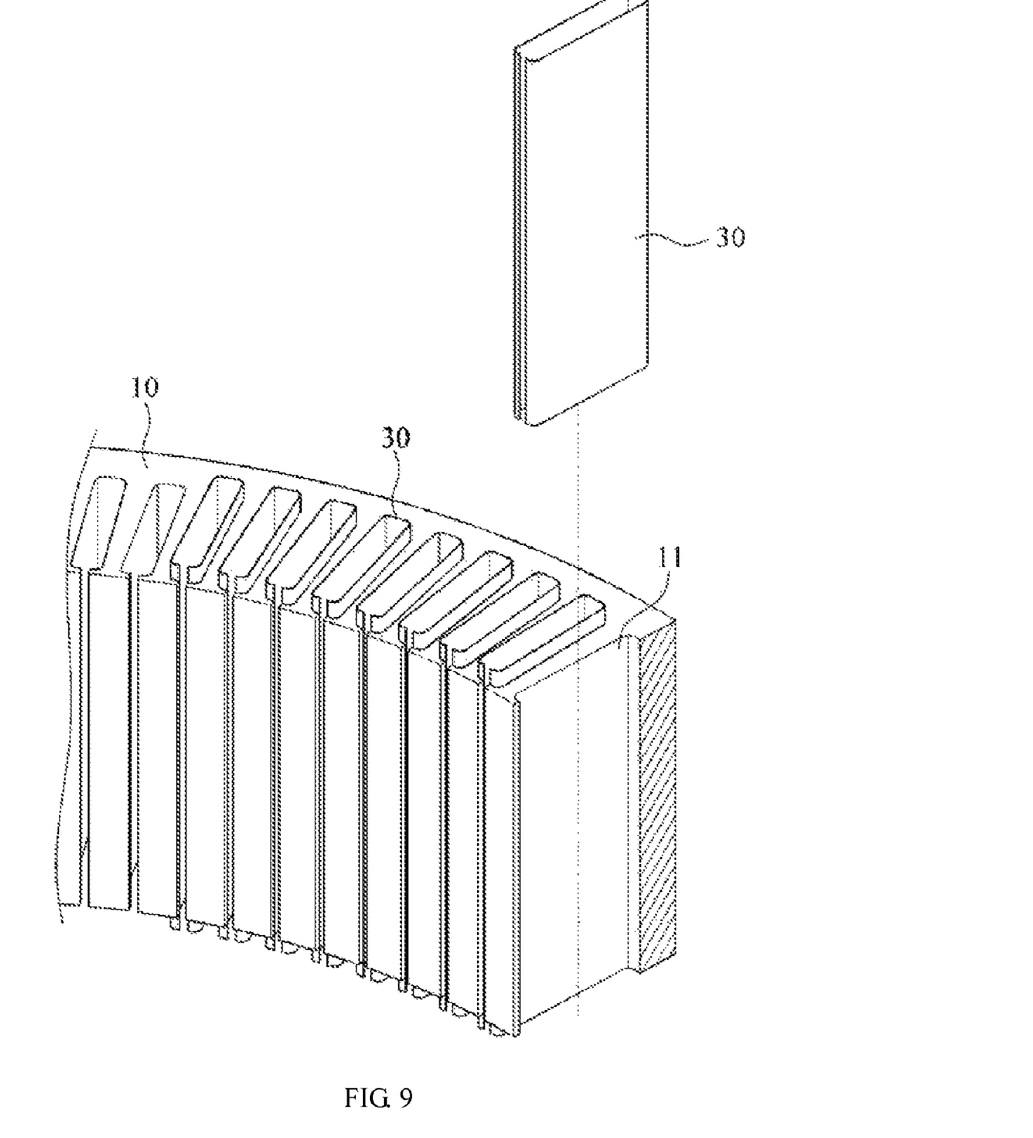
FIG. 9 shows an insulating paper installing step according to the present invention.

In the insulating paper installing step, as shown in FIG. 9, a plurality of insulating paper sleeves 30 corresponding to inner peripheral walls of the through slots 11 are inserted into the through slots 11 of the stator ring 10, respectively.

Figure 10:
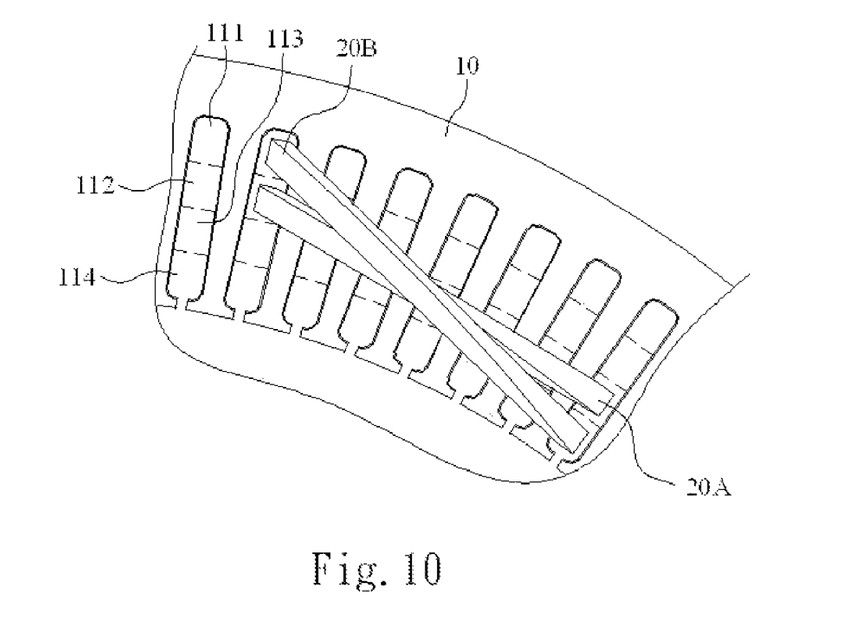
FIGS. 10 and 11 show a wire unit inserting step according to the present invention.
Figure 11:
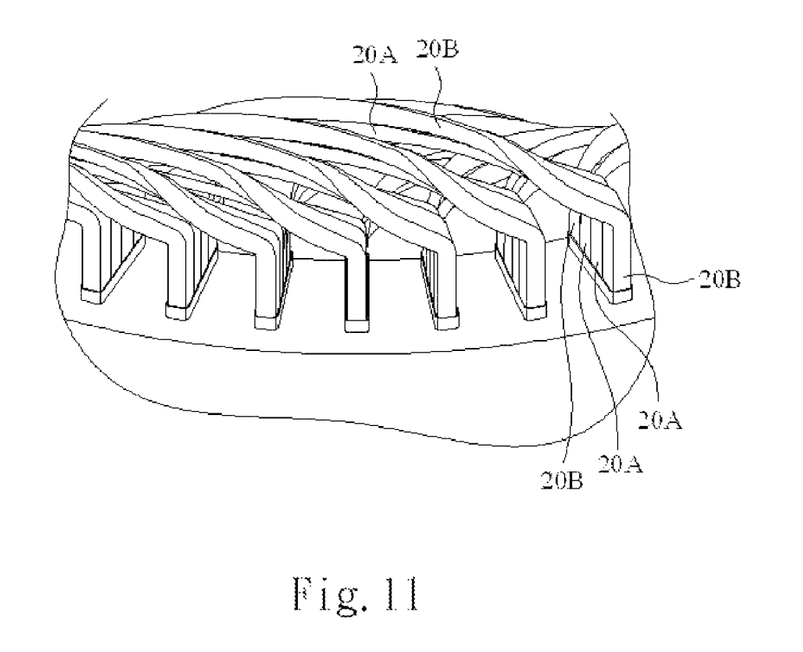

In the wire unit inserting step, referring to FIG. 10 and FIG. 11, each through slot 11 of the stator ring 10 is divided, along an outside-to-inside direction, into four equal sections, namely a first section 111, a second section 112, a third section 113, and a fourth section 114. Besides, the wire units 20 are separated into two equal groups, namely a first group and a second group. For each wire unit 20 in the first group, hereinafter referred to as first-group wire unit 20A, one of the two arms thereof is inserted into the second section 111 of a corresponding one of the through slots 11, and the other of the two arms spans across five through slots 11 in the same direction and is inserted into the third section 113 of the following (sixth) through slot 111. For each wire unit 20 in the second group, hereinafter referred to as second-group wire unit 20B, one of the two arms thereof is inserted into the first section 112 of a corresponding one of the through slot 11, and the other of the two arms spans across five through slots 11 in the same direction and is inserted into the fourth section 114 of the following (sixth) through slot 11. The first-group wire units 20A and the second-group wire units 20B are sequentially inserted into all the through slots 11 in an interlacing manner so as to form an annular winding structure. At the same time, the wire ends of the first-group and second-group wire units 20A, 20B jut out from opposite ends of the through slots 11. In the wire unit pressing and arranging step, a pressure is applied by a flat surface of a pressing machine to upper ends (the V-shaped bent portions) of the already inserted wire units 20 such that the wire units 20 form an even surface on one side of the stator ring 10. Meanwhile, the wire ends jutting out from an opposite side of the stator ring 10 are flush with one another.

Figure 12:
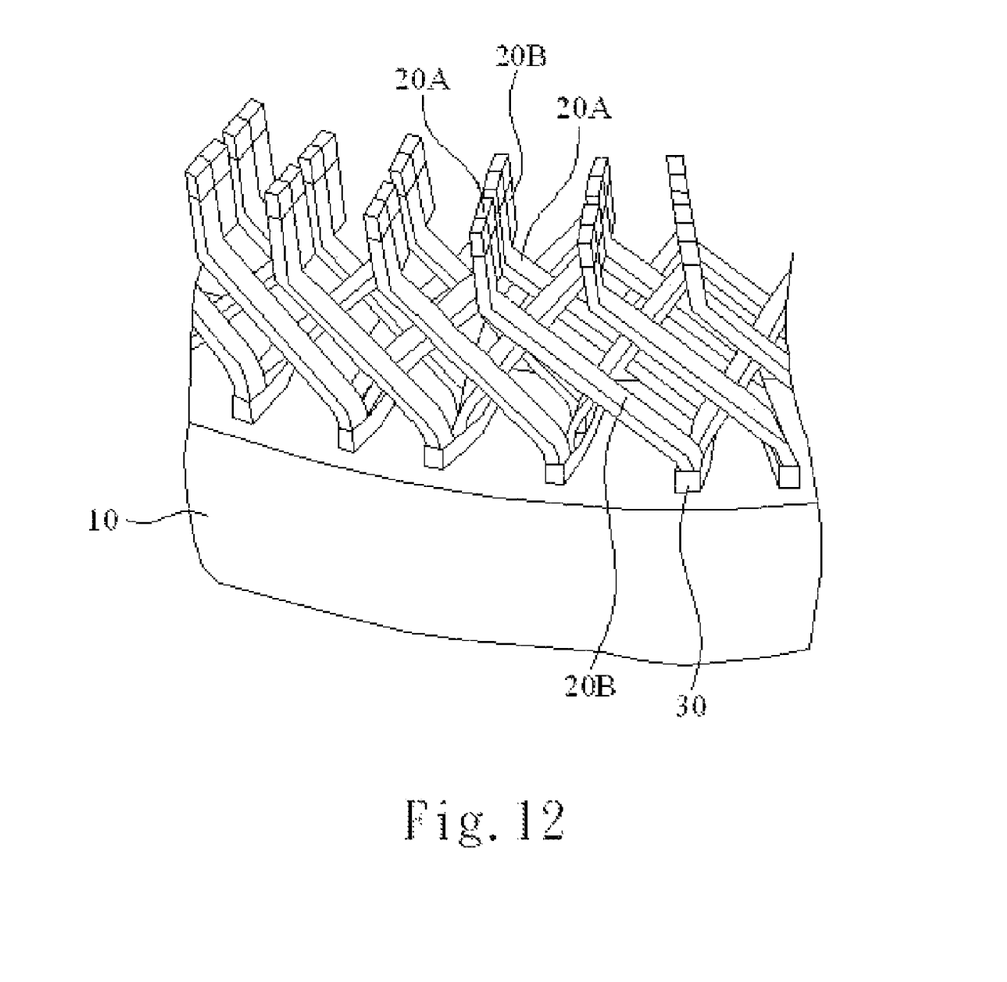
FIG. 12 shows a wire end twisting step according to the present invention.

Referring to FIG. 12, the wire end twisting step is carried out as follows. The wire ends of the first-group wire units 20A are bent toward the same tangential direction at positions where the wire ends begin to jut out from the through slots 11. In addition, the tips of the bent wire ends are bent so as to point outward from the through slots 11. After that, the wire ends of the second-group wire units 20B that jut out from the through slots 11 are bent toward an opposite tangential direction (i.e., opposite to the tangential direction toward which the wire ends of the first-group wire units 20A are bent), thus corresponding in position to the wire ends of the first-group wire units 20A. Then, the tips of the wire ends of the second-group wire units 20B are bent so as to point outward from the through slots 11 and be juxtaposed with the tips of the wire ends of the corresponding first-group wire units 20A. More specifically, the tips of the wire ends of the second-group wire units 20A that extend from the first sections 111 correspond in position to and are juxtaposed with the tips of the wire ends of the corresponding first-group wire units 20B that extend from the second sections 112, and the tips of the wire ends of the first-group wire units 20A that extend from the third sections 113 correspond in position to and are juxtaposed with the tips of the wire ends of the corresponding second-group wire units 20B that extend from the fourth sections 114.

Figure 13:
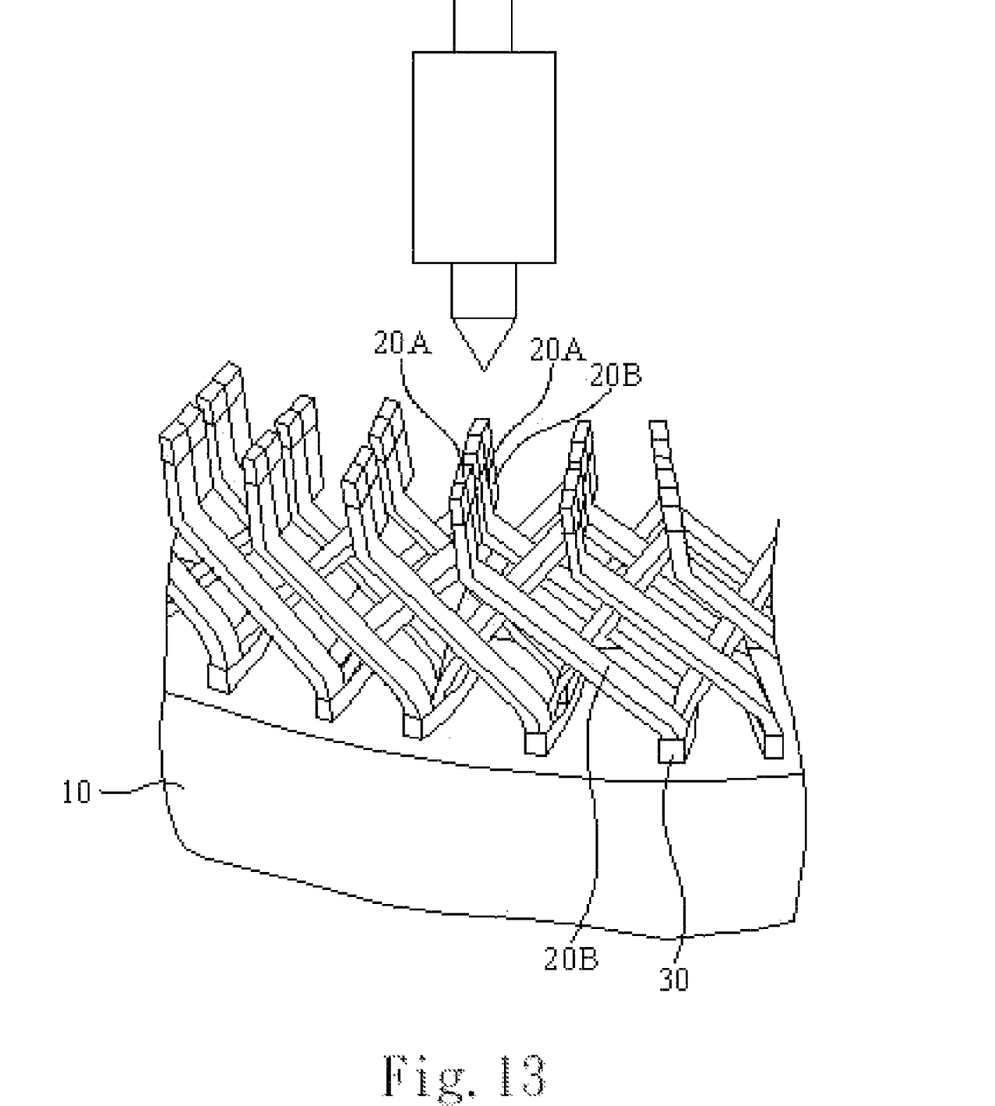
FIG. 13 shows a wire end soldering step according to the present invention.

In the wire end soldering step, referring to FIG. 13, the bent and juxtaposed tips of the wire ends of the first-group and second-group wire units 20A, 20B are soldered such that the originally unconnected wire units 20 form a circuit, i.e., a connected loop, for use as an induction coil.

A stator made by the method of the present invention is capable of effectively reducing copper loss, delivering enhanced performance, and preventing the temperature of a motor equipped with the stator from rising rapidly during operation. In addition, by interlacing the wire units closely and neatly, the density of windings can be efficiently controlled, and the slot fill factor is increased, thus enhancing the overall power generation efficiency of a generator using the stator.

The foregoing embodiments are illustrative of the technical concepts and characteristics of the present invention so as to enable a person skilled in the art to gain insight into the contents disclosed herein and to implement the present invention accordingly. However, it is understood that the embodiments are not intended to restrict the scope of the present invention. Hence, all equivalent modifications and variations made to the disclosed embodiments without departing from the spirit and principle of the present invention should fall within the scope of the appended claims.

What is claimed is:

1. A method for making a wound stator of an automotive generator, the method comprising:
   a stator ring forming step comprising making a stator ring by a stator ring forming process such that the stator ring is provided with a plurality of annularly arranged elongate radial through slots, wherein a total number of the through slots is a multiple of three;
   a copper wire cutting step comprising cutting an enameled copper wire having a rectangular cross section into a plurality of straight wire units having an equal length;
   a wire unit curving and bending step, comprising:
      curving each said straight wire unit into a U shape, and bending a smoothly curved portion of each said U-shaped wire unit into a V shape;
   a wire-end insulating coating removing step comprising cutting off an insulating coating on two arms of each said curved and bent wire unit;
   an insulating paper installing step comprising inserting a plurality of insulating paper sleeves corresponding to inner peripheral walls of the through slots into the through slots of the stator ring, respectively;
   a wire unit inserting step, comprising:
      dividing each said through slot of the stator ring along an outside-to-inside direction into a first section, a second section, a third section, and a fourth section;
      separating the wire units into a first group and a second group;
      inserting one said arm of each said wire unit in the first group into the second section of a corresponding said through slot, and the other said arm, which spans across five said through slots in a same direction, into the third section of a following sixth said through slot; and
      inserting one said arm of each said wire unit in the second group into the first section of a corresponding said through slot, and the other said arm, which spans across five said through slots in the same direction, into the fourth section of a following sixth said through slot, wherein the wire units in the first group and in the second group are sequentially inserted into all the through slots in an interlacing manner so as to form an annular winding structure while wire ends of the wire units jut out from opposite ends of the through slots;
   a wire unit pressing and arranging step comprising applying a pressure to upper ends of the inserted wire units, such that the wire units form an even surface on one side of the stator ring while the wire ends jutting out from an opposite side of the stator ring are flush with one another;
   a wire end twisting step, comprising:
      bending the wire ends of the wire units in the first group toward a same tangential direction at positions where the wire ends of the wire units in the first group begin to jut out from the through slots;
      bending tips of the wire ends of the wire units in the first group so as for said tips to point outward from the through slots;
      bending the wire ends of the wire units in the second group that jut out from the through slots toward a tangential direction opposite to that toward which the wire ends of the wire units in the first group are bent; and
      bending tips of the wire ends of the wire units in the second group so as for said tips to point outward from the through slots, wherein the tips of the wire ends of the wire units in the second group that extend from the first sections correspond in position to and are juxtaposed with the tips of the wire ends of corresponding said wire units in the first group that extend from the second sections, and wherein the tips of the wire ends of the wire units in the first group that extend from the third sections correspond in position to and are juxtaposed with the tips of the wire ends of corresponding said wire units in the second group that extend from the fourth sections; and
   a wire end soldering step comprising soldering the bent and juxtaposed tips of the wire ends of the wire units in the first group and in the second group such that the originally unconnected wire units form a connected loop.

2. The method of claim 1, wherein the wire-end insulating coating removing step comprises:
   fixing each said arm of each said wire unit by a fixture so as for the each said arm to correspond in position to a gap between two milling cutters which rotate coaxially and synchronously;
   cutting off the insulating coating on two opposite surfaces of a corresponding said wire end by the milling cutters;
   rotating the each said arm of the each said wire unit; and
   cutting off the insulating coating on other two surfaces of the corresponding wire end by the milling cutters.

3. The method of claim 2, wherein the total number of the through slots in the stator ring forming step is 96.

4. The method of claim 1, wherein the wire-end insulating coating removing step comprises:
- fixing each said wire end of each said wire unit at a fixing seat of a stamper;
- machining the each said wire end by a stamping cutter of the stamper so as to remove the insulating coating on two opposite surfaces of the each said wire end of the each said wire unit, wherein the stamping cutter is located to a side of the each said wire unit; rotating a corresponding said arm of the each said wire unit; and
- removing the insulating coating on other two surfaces of the each said wire end by the stamping cutter of the stamper.

5. The method of claim 4, wherein the total number of the through slots in the stator ring forming step is 96.

6. The method of claim 1, wherein the wire-end insulating coating removing step comprises:
- fixing each said arm of each said wire unit by a fixture;
- machining the tip of a corresponding said wire end of the each said wire unit by two opposite electric cutters so as to scrape off the insulating coating on two opposite surfaces of the corresponding wire end of the each said wire unit;
- rotating the each said arm of the each said wire unit; and
- scraping off the insulating coating on other two surfaces of the corresponding wire end by the cutters.

7. The method of claim 6, wherein the total number of the through slots in the stator ring forming step is 96.

* * * * *